(12) United States Patent
Aiouaz et al.

(10) Patent No.: US 8,346,251 B2
(45) Date of Patent: Jan. 1, 2013

(54) SYSTEM AND METHOD FOR TIME SAVING CELL SEARCH FOR MOBILE DEVICES IN SINGLE AND MULTIPLE RADIO TECHNOLOGY COMMUNICATION SYSTEMS

(75) Inventors: Faical Aiouaz, Munich (DE); Fei Gao, Hannover (DE)

(73) Assignee: Agere Systems Inc., Allentown, PA (US)

( * ) Notice: Subject to any disclaimer, the term of this patent is extended or adjusted under 35 U.S.C. 154(b) by 221 days.

(21) Appl. No.: 12/529,836

(22) PCT Filed: May 23, 2007

(86) PCT No.: PCT/US2007/012251
§ 371 (c)(1),
(2), (4) Date: Sep. 3, 2009

(87) PCT Pub. No.: WO2008/153514
PCT Pub. Date: Dec. 18, 2008

(65) Prior Publication Data
US 2010/0062764 A1    Mar. 11, 2010

(51) Int. Cl.
*H04W 4/00* (2009.01)
(52) U.S. Cl. .......................... 455/434; 370/329
(58) Field of Classification Search .................. 455/436, 455/426.1, 434, 422.1, 69, 526, 411, 435.3, 455/445, 435.1, 435.2; 370/331, 350, 208, 370/315, 332, 338, 342, 335, 329, 353
See application file for complete search history.

(56) References Cited

U.S. PATENT DOCUMENTS

| 6,188,682 | B1 | 2/2001 | Takagi et al. |
| 2007/0183307 | A1* | 8/2007 | Akita et al. .................. 370/208 |
| 2008/0102784 | A1* | 5/2008 | Mittal et al. ............... 455/404.1 |

FOREIGN PATENT DOCUMENTS

| WO | WO 01/26248 | 4/2001 |
| WO | WO 03/021426 | 3/2003 |

OTHER PUBLICATIONS

3rd Generation Partnership Project; Technical Specification Froup Radio Access Network; UE Procedures in Idle Mode and Procedures for Cell Reselection in Connected Mode (Release 1999), 3GPP TS 25.304 V3.7.0 (Jun. 2001). France, 2001.

* cited by examiner

*Primary Examiner* — Kiet Doan (57) ABSTRACT

A cellular device has a stacked protocol, with an upper layer and a lower layer. The lower layer includes a multiple carrier detection unit, a memory and a digital processing system. The multiple carrier detection unit receives a plurality of wireless carrier signals and provides a respective plurality of output digital streams. The memory is used to store a target cell search list, and the digital processing system processes the digital streams in parallel based upon parameters within the target cell search list. The parameters may include a frequency indicator and a radio access technology (RAT) indicator. The lower layer controls the multiple carrier detection unit to detect the wireless carrier signals based upon the frequencies and RATs in the target cell search list.

8 Claims, 9 Drawing Sheets

SYSTEM AND METHOD FOR TIME SAVING CELL SEARCH FOR MOBILE DEVICES IN SINGLE AND MULTIPLE RADIO TECHNOLOGY COMMUNICATION SYSTEMS

FIELD OF THE INVENTION

The present invention relates to cellular wireless communications technologies. More particularly, the present invention provides a method and related system for performing rapid cell-searching across both single and multiple radio access technologies.

BACKGROUND OF THE INVENTION

A wide variety of devices are available today that employ cellular technology for wireless communications purposes, and an array of cellular systems exist to provide the supporting cellular infrastructure for these devices. Numerous underlying radio access technology (RAT) standards exist that may be used to provide this cellular infrastructure, such as GSM, 3GPP and 3G beyond. The ability to perform a cell search to find the supporting cellular infrastructure is a fundamental requirement in any cellular device. Moreover, the ability to quickly perform a cell search is highly desirable, as this provides for cellular handoffs with fewer dropped data links, and faster connection times after power-on or out-of-service conditions.

Increasingly, consumers are demanding that functions that were once provided by two or more devices be consolidated into a single device. As these functions may conceivably employ different RATs, a single device may have to be able to perform cell searching across a multiplicity of RATS. Additionally, the RATs themselves undergo generational evolution to provide enhanced functionality. Backward compatibility between these generations may be highly desirable in some devices, such as cellular telephones that support older GSM, newer 3GPP technologies, and cutting-edge 3GBeyond.

Figure 1:
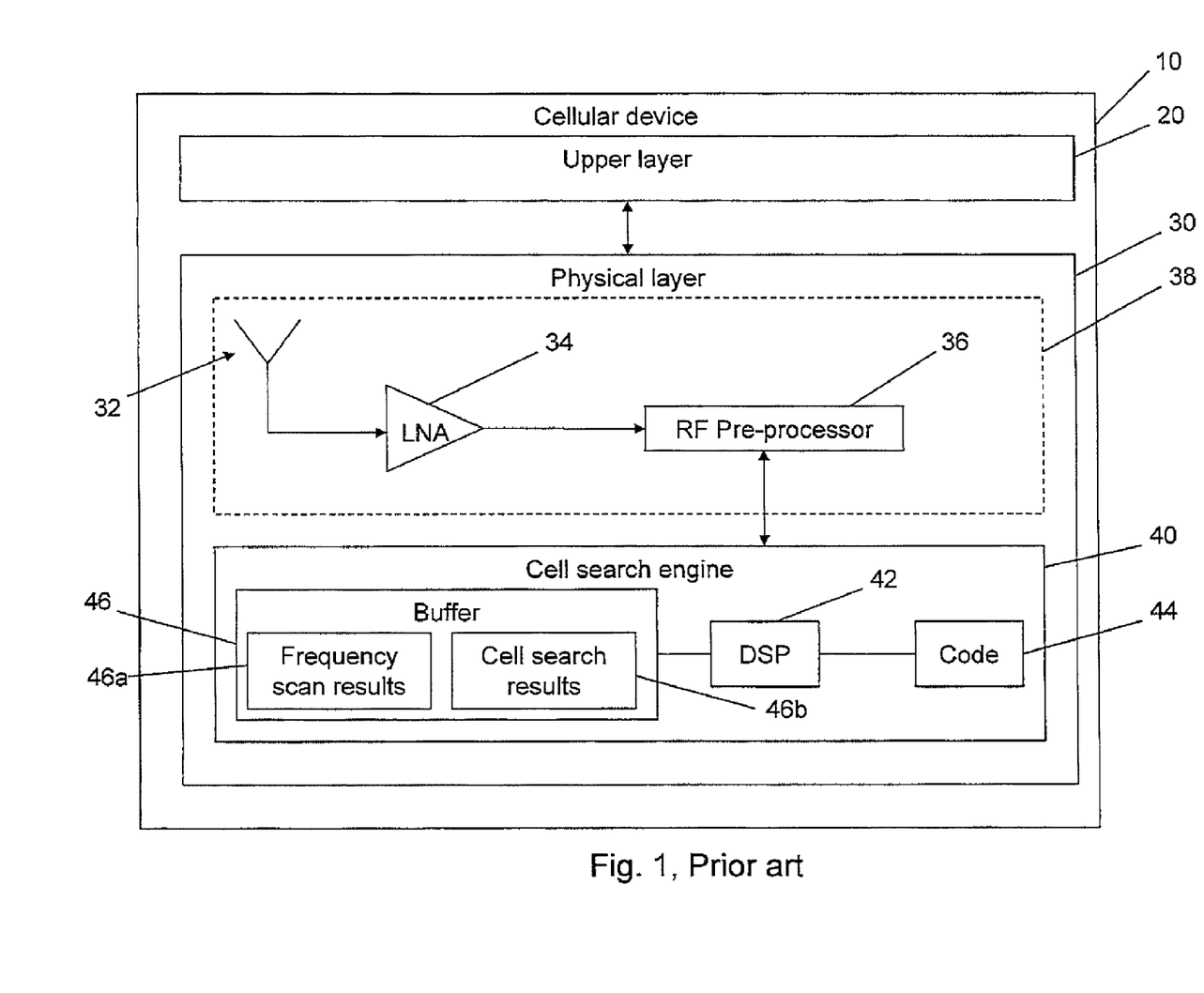
FIG. 1 illustrates a prior art cellular device.

With reference to FIG. 1, a cellular device 10, such as a PDA or a mobile phone, includes an upper layer 20 in communications with a lower, physical layer 30. The upper layer 20 is typically implemented in software, while the lower layer 30 may be a combination of both hardware and software. The physical layer 30 includes an antenna 32, a low noise amplifier 34 and a radio-frequency (RF) pre-processor 36, which together form a receiver 38. The LNA 34 is an analog device that amplifies the relatively weak RF signals provided by the antenna 34, and feeds an amplified signal into the RF pre-processor 36. RF pre-processor 36 typically down-converts the amplified signal into a baseband or intermediate frequency (IF) signal, and then utilizes an analog-to-digital converter (ADC) to convert the baseband or IF signal into a corresponding stream of digital samples. The type of conversion employed by the ADC will depend upon the type of modulation used by the RAT, such as binary phase-shift keying (BPSK), quadrature phase-shift keying (QPSK), quadrature amplitude modulation (QAM), differential phase-shift keying (DPSK), etc. This digital stream is then used by a cell search engine 40.

The cell search engine 40 within the lower layer 30 typically includes a digital signal processor (DSP) 46 connected to both a non-volatile memory holding program code 44, and a working buffer 46. The working buffer 46 is generally some type of fast memory, such as RAM or internal registers, and is used by the DSP 42 to hold and manipulate digital data provided by the RF pre-processor 36. The program code 44 is executable by the DSP 42, and contains algorithms necessary to support cell searching as determined by the RAT standards, such as digital demodulation, descrambling, channel decoding, slot synchronization, frame boundary detection, Gold code detection, or the like. Alternatively, the cell search engine 40 may be implemented with dedicated specific digital signal processing building blocks that may be controllable or even programmable, as known in the art.

A cell search begins with the upper layer 20 sending a frequency scan request for a frequency to the lower layer 30 to determine if there are any cellular stations nearby operating on the frequency. The lower layer 30 scans the frequency and generates frequency scan results 46a, which are passed up to the upper layer 20. Based upon the frequency scan results 46a, the upper layer 20 may request from the lower layer 30 a cell search procedure within the frequency, or a scan of a new frequency. To perform the cell search procedure, the upper layer 20 instructs the lower layer 30 to perform a cell search on a particular frequency. The cell search engine 40 iterates through each RAT supported by the device 10, performing a cell search procedure as determined by each RAT protocol, which can be quite complex, and passes cell search results 46b up to the upper layer 20 for that frequency. This process is iterated over each frequency of interest, which are typically those frequencies having the highest power. Based upon the cell search results 46b, the upper layer 20 may determine that no suitable cell exists within the searched frequency, and so initiates searching in a new frequency; or, the upper layer 20 may decide that a suitable cell has been found, and may then attempt to connect to the cell.

If multiple RATs are to be supported over several frequency bands, the serial nature of the cell searching process can lead to quite lengthy cell search times, and to large amounts of communications between the upper layer 20 and lower layer 30. It would therefore be desirable to provide a cell searching method, and related device, that provides for rapid cell searching across multiple radio access technologies and frequency bands.

SUMMARY OF THE INVENTION

In one aspect, a method of performing a cell search for a cellular device is provided. In one embodiment, a plurality of cell search parameter sets are provided for a respective plurality of target searches that are desired to be performed. Cell searching is then simultaneously performed for these target searches based upon the cell search parameter sets provided, and a respective plurality of signal processing results are thereby obtained. The cellular device utilizes the signal processing results to determine whether or not to connect to at least one cell corresponding to at least one of the target searches. Each cell search parameter set for the respective target search may include a frequency indicator, an indicator of the radio access technology (RAT) used, and an indicator of the network. In a specific embodiment, it is an upper layer within the cellular device that provides the cell search parameters to a lower layer. The lower layer within the cellular device performs the cell searching, and provides the upper layer with the signal processing results. The upper layer then causes the cellular device to connect to at least one cell based upon corresponding signal processing results.

In another aspect, a cellular device is provided. In a particular embodiment, the cellular device has a stacked protocol, with an upper layer and a lower layer. The lower layer includes a multiple carrier detection unit, a memory and a digital processing system in communications with the memory and the multiple carrier detection unit. The multiple carrier detection unit is capable of receiving a plurality of wireless carrier signals and providing a respective plurality of output digital streams. The memory is used to store a plurality of cell search parameter sets, and the digital processing system processes the digital streams according to the cell search parameter sets to perform cell searching on the wireless carrier signals. In one embodiment, the digital processing system processes the digital streams in parallel, while in another embodiment the digital processing system processes the digital streams serially, but in real time. In certain embodiments, each cell search parameter set may include a frequency indicator, an indicator of a RAT, and an indicator of the network. The lower layer may control the multiple carrier detection unit to detect the wireless carrier signals based upon the frequencies in the cell search parameter sets, and may process the digital streams according to the RATS. In one embodiment, the digital processing system is further capable of providing a plurality of signal processing results to the upper layer. The upper layer may then cause the cellular device to connect to at least one cell corresponding to at least one of the signal processing results.

DETAILED DESCRIPTION

Figure 2:
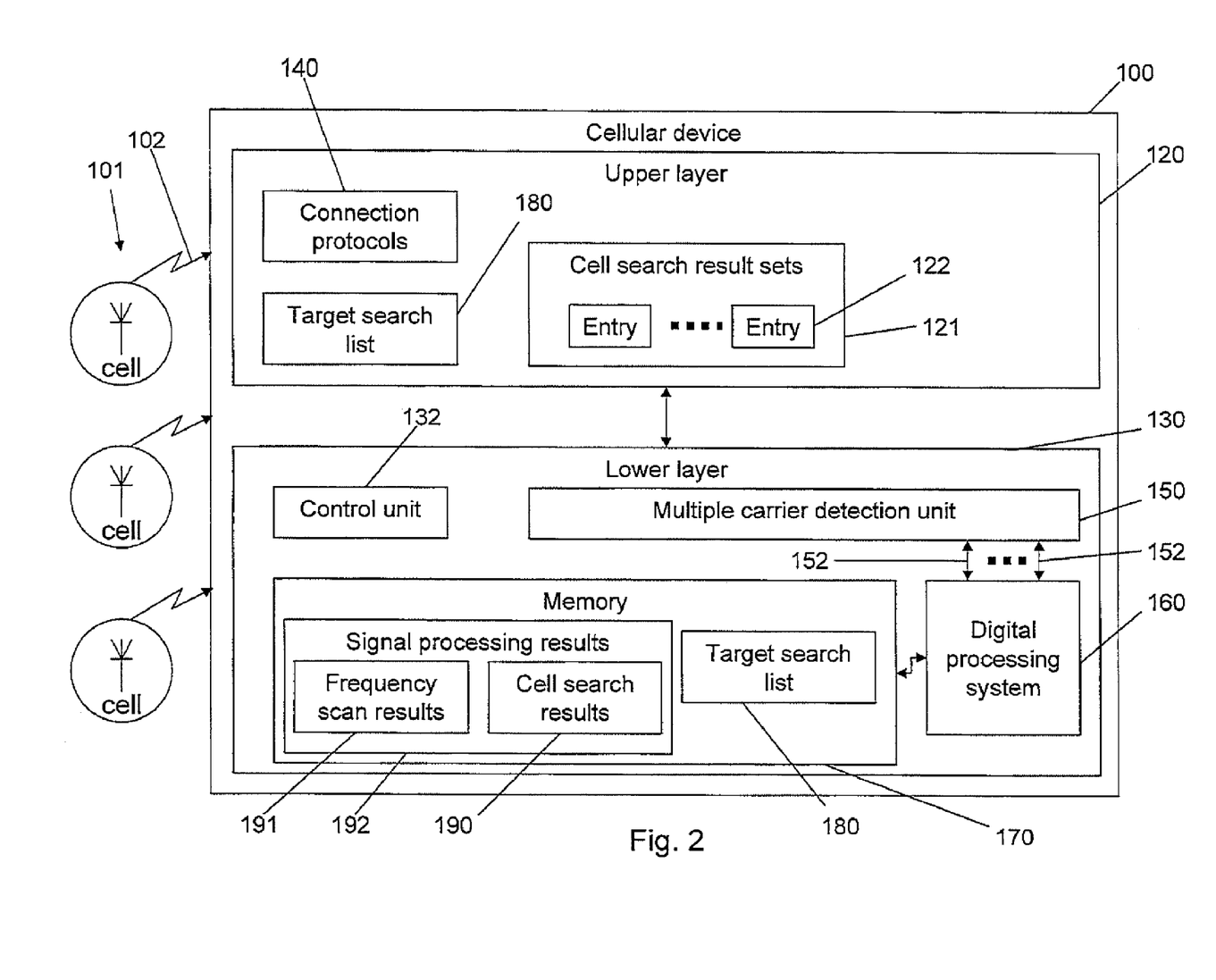
FIG. 2 illustrates a first embodiment cellular device.
Figure 3:
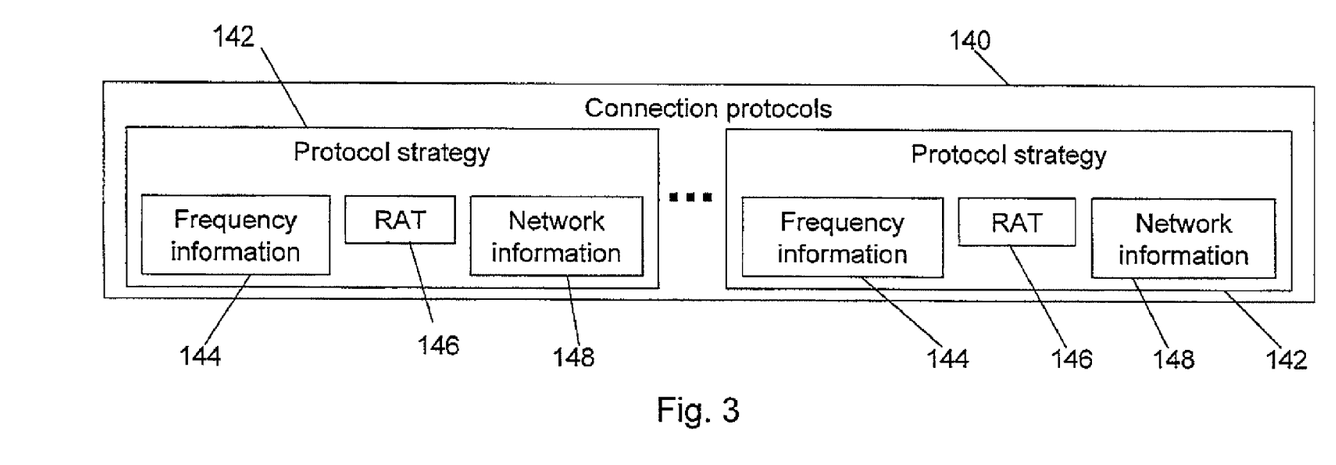
FIG. 3 shows connection protocols indicated in FIG. 2.
Figure 4:
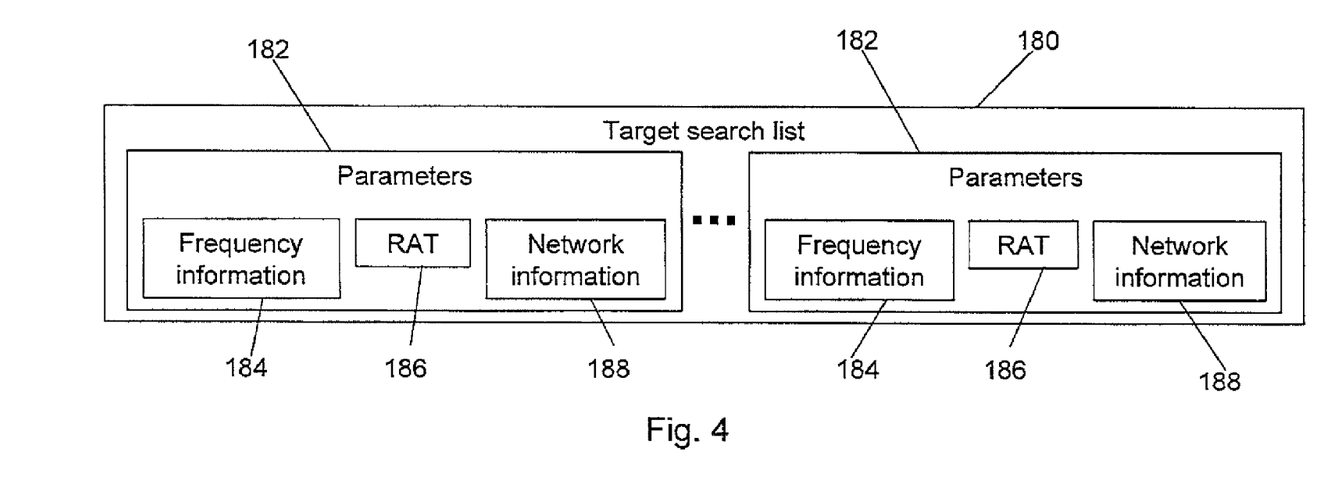
FIG. 4 shows a target search list indicated in FIG. 2.

A first embodiment cellular device 100 is shown in FIGS. 2-4, with variations shown in FIGS. 5-7 and FIG. 9. The cellular device 100 may be a cellular telephone, a personal data assistant (PDA), or any other device that employs cellular technology to receive or send information on one or more wireless links. Within the reception range of the cellular device 100, one or more cells 101 broadcast wireless signals 102 in a standard manner. The wireless signals 102 comprise carriers that encode the information sent by the cells 101 based upon the radio access technology (RAT) employed by the cell 101, and which is to be received and decoded by the cellular device 100. The cells 101 may transmit on a plurality of carriers 102, and each cell 101 may employ a RAT that is different from that of the other cells 101. Indeed, a cell 101 may employ multiple carriers 102, and within the same cell 101, the information transmitted by these carriers 102 may be encoded based upon different RAT standards. The transmission and reception of information based upon RAT standards is well known and defined in the art, and includes, for example, GSM, 3GPP and 3Gbeyond.

In this embodiment, the cellular device 100 comprises a stacked protocol that includes an upper layer 120 in communications with a lower layer 130. The lower layer 130 includes a control unit 132 that handles both communications with the upper layer 120, and also internal communications and available resources between different entities within the lower layer 130. It should be understood in the following that the upper layer 120 and lower layer 130 may be broadly defined, and each layer 120, 130 may comprise additional sub-layers internal to that layer 120, 130. The upper layer 120 may be implemented in software, although hardware implementations may also be possible. The lower layer 130 may be the so-called physical layer, and so will typically include hardware components. Other components or functions of the lower layer 130 may, however, also be implemented in software. As known in the art, any software implementation of a functional block will generally have underlying hardware in the form of one or more processors and appropriately coded computer code that, when executed by the one or more processors, provides the desired functionality. A single processor within the cellular device 100 may be suitable to provide the software-based functionality of the upper 120 and lower 130 layers. Alternatively, any software-based implementation of the upper layer 130 may execute on its own respective processor, while any software-based implementation in the lower layer 130 may execute on another respective processor. Such design choices are familiar to those in the art.

The upper layer 120 includes a database of connection protocols 140, which provides information that assists the cellular device 100 in connecting to one or more service providers and their related RATS. The connection protocols 140 may depend upon the functionalities that the device 100 is to support, such as a dual-mode telephone that supports both GSM and 3GPP protocols. The connection protocols 140 may be provided, for example, by the manufacturer, or by a service provider who offers the cellular device 100 to customers. As shown in FIG. 3, the connection protocols 140 may include one or more protocol searching strategies 142 for finding a potential cell 101 upon which the cellular device 100 can camp. These strategies 142 may be based, for example, on industry standards, service provider specifics, or the like. Each strategy 142 may include frequency information 144 within which a potential carrier 102 may be found, one or multiple RATs 146 employed by that carrier 102 to encode and transmit information, and network related information 148. The frequency information 144 may include, for example, information about frequency bands, sets of frequencies, or combinations of both. The network related information 148 may identify a network (e.g., provide full or partial network identity information), and may further include, for example, networks that are to be supported by the device 100. The connection protocols 140 may be held at least in part, for example, in subscriber data contained in a SIM used within the device 100. Hence, although the connection protocols database 140 is shown as a single block in the FIG. 2, it will be understood that in practice the database 140 could be dispersed over one or more storage regions; for example, a portion of the database 140 could be held in a ROM or other non-volatile memory (NVM) within the device 100, and another portion of the database 100 could be stored on a user-swappable SIM. Any suitable method may be used, internally to the cellular device 100, to encode and access the frequency information 144, RAT 146 information and the network related information 148 within the connection protocols database 140.

The lower layer 130 includes a multiple carrier detection unit 150. The multiple carrier detection unit 150 is capable of receiving a plurality of carriers 102 simultaneously, demodulating the carriers 102 to obtain a respective plurality of analog baseband or intermediate frequency (IF) signals, and digitally converting the analog baseband or IF signals into another respective plurality of digital streams 152. The lower layer 130 also includes a digital processing system 160 that receives the digital streams 152, and processes the digital streams 152 to perform cell searching on the received carriers 102. The digital processing system 160 may use a memory 170 to store data received from the multiple carrier detection unit 150, to store parameters needed to perform the cell searching on the respective digital data streams 152, and to store processing results. The memory 170 may be embedded within the digital processing system 160 in a single-chip implementation, or may be one or more separate devices that electrically connect to the digital processing system 160.

Figure 5:
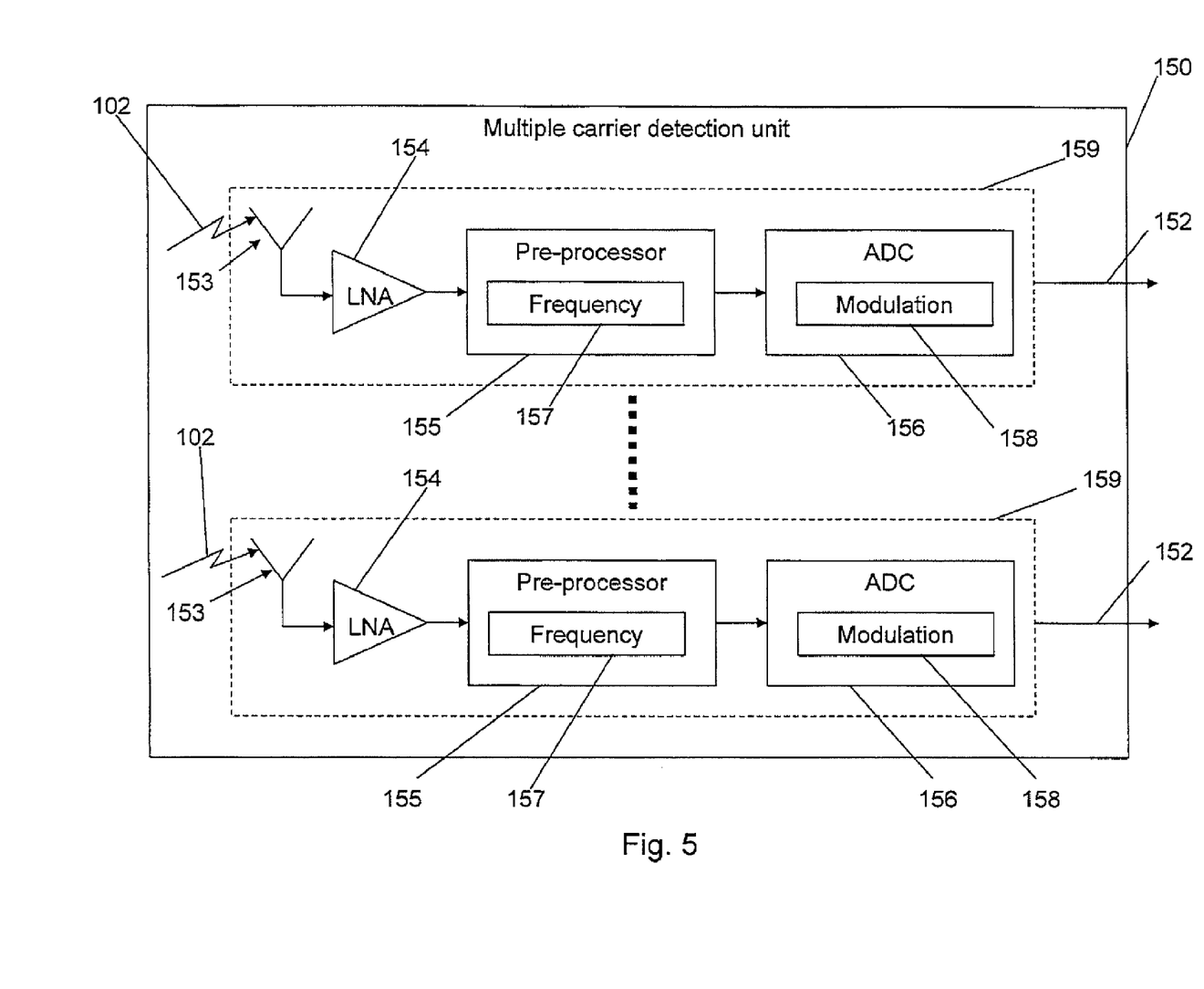
FIG. 5 illustrates a multiple carrier detection unit shown in FIG. 2.

One embodiment for the multiple carrier detection unit 150, shown in FIG. 5, may include a plurality of wireless receivers 159, each of which receives a wireless carrier 102 and provides a corresponding digital stream output 152. Each wireless receiver 159 may include an antenna 153, a low noise amplifier (LNA) 154, a pre-processor 155 and an analog-to-digital converter (ADC) 156. Each pre-processor 155 provides a baseband or IF signal from a frequency received on the antenna 153 and gained by the LNA 154; the value for this frequency may be selected with a frequency selector 157, which can be provided as input into the multiple carrier detection unit 150. Each ADC 156 provides a corresponding digital stream 152 of the baseband or IF signal based upon the type of modulation believed to be used by the carrier 102. Each ADC 156 may be programmed to accept different modulation types by setting a modulation selector 158, the value for which can also be provided as input into the multiple carrier detection unit 150.

In alternative embodiments, the output of a single antenna 153 may feed into the respective LNAs 154 of each receiver 159. Or, the output of a single antenna 153/LNA 154 pair may feed into each of the respective preprocessors 155 of each receiver 159.

Figure 6:
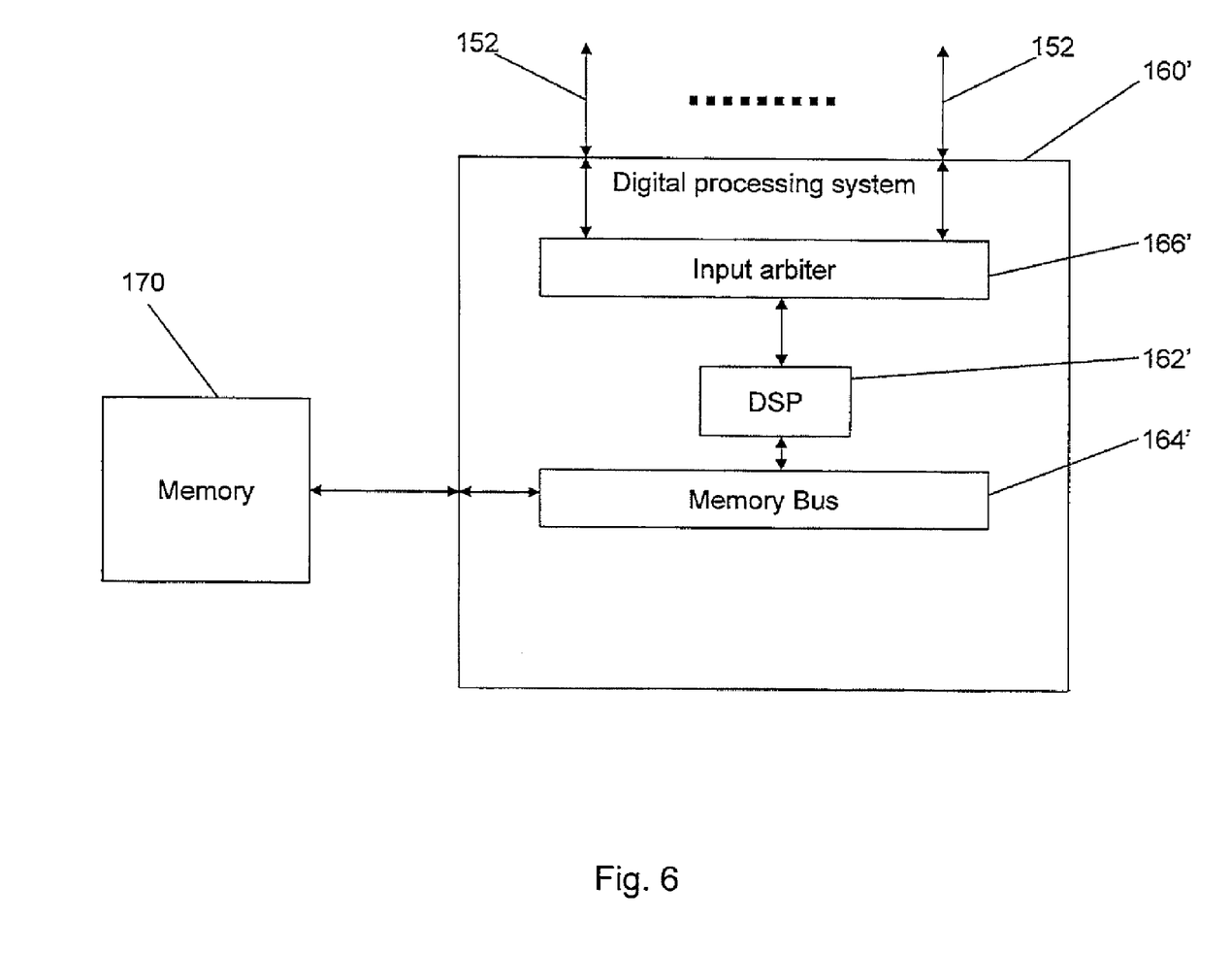
FIG. 6 shows an embodiment for a digital processing system depicted in FIG. 2.

The digital processing system 160 may be provided by any suitable design known in the art. For example, a first embodiment digital processing system 160' is shown in FIG. 6. The digital processing system 160' includes an input arbiter 166', which accepts as input the digital streams 152 from the multiple carrier detection unit 150. The input arbiter 166' is connected to a digital signal processor (DSP) 162', and provides only one of the digital streams 152 to the DSP 162' at a time. The DSP 162 is aware of which digital stream 152 the arbiter 166' provides, and controls the arbiter 166' to select a desired digital stream 152 to read. The DSP 162' is in turn connected to a memory bus 164, which permits the DSP 162' to interface with the memory 170. The input arbiter 166' provides a logical interface through which the DSP 162' can read the various digital streams 152, and the memory bus 164' permits the DSP 162' to access the memory 170 for read/write purposes. In this embodiment, the DSP 162' is ideally fast enough to be able to process in real-time the digital data streams 152. That is, the average data processing rate of the DSP 162' should at least equal the total data rate of all the digital streams 152. Although the DSP 162' actually processes the data streams 152 in a serial fashion, the speed of the DSP 162' may be so great that the net effect is that the data streams 152 appear to be processed in parallel in real time. The DSP 162' may further include local memory private to the DSP 162', which the DSP 162' may use as a scratch pad during the various signal processing steps applied to the data streams 152 as required by RAT standards. This local memory may further contain the program code that controls the operations of the DSP 162', or this program code may be located in the memory 170. The program code should contain the algorithms needed to perform cell searching as indicated by all the RAT standards to be supported by the device 100. Moreover, in some embodiments the program code that is executable by the DSP 162' may be changed by the control unit 132 upon instructions from the upper layer 120; this feature provides for a digital processing system 160 that is readily updated to accommodate new standards and related algorithms.

Although the above embodiment makes use of a DSP 162' to perform logical operations upon the digital data streams 152 to perform cell searching, it should be understood that other logical components may be used in place of the DSP 162'. In particular, specially-designed, dedicated logic blocks may be effectively employed. For example, field programmable gate arrays (FPGAs), or application specific integrated circuits (ASICs) may be employed. However, DSPs may offer greater long-term flexibility to accommodate changing and evolving RAT standards, as the programs which the DSPs execute to perform the various RAT cell searching algorithms may be changed without needing to change other underlying hardware, as indicated above.

Figure 7:
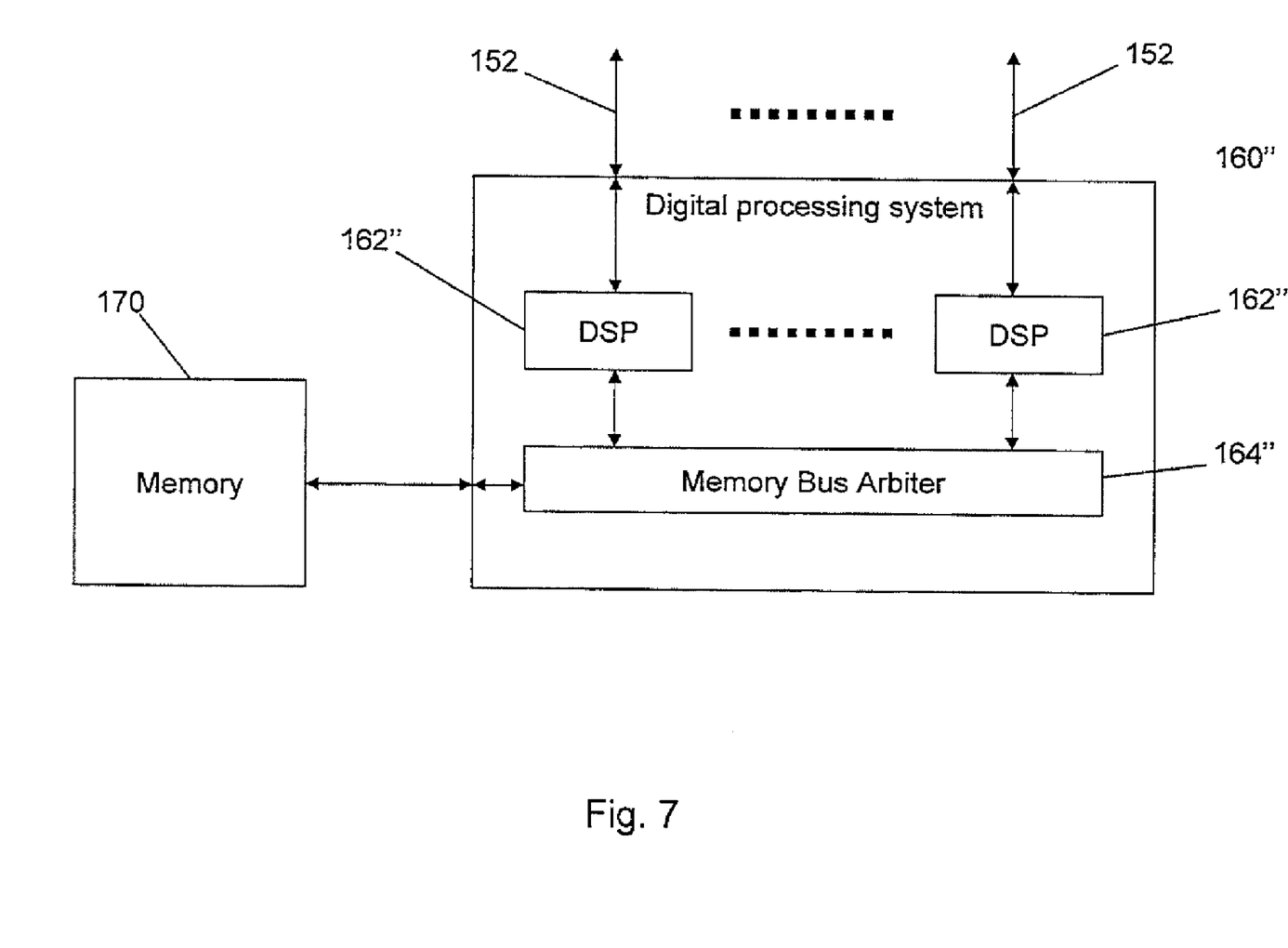
FIG. 7 shows another embodiment for the digital processing system depicted in FIG. 2.

An alternative embodiment for the digital processing system 160 is shown in FIG. 7. A second embodiment digital processing system 160" includes a plurality of DSPs 162", each of which inputs one or more than one of the digital data streams 152 from the multiple carrier detection unit 150. Each DSP 162" is also connected to a memory bus arbiter 164". The memory bus arbiter 164" permits one DSP 162" at a time to access the memory 170, and optionally exchange data with another DSP 162". Each DSP 162" ideally has a data processing speed that is at least as great as the input data rate of the respective single or multiple data streams 152 of that DSP 162". The plurality of DSPs 162" may thus process the data streams 152 in parallel, and in real time. As with the single DSP 162', the DSPs 162" may each further include local memory that may be used as a scratch pad; the local memory may contain the program code that controls the operations of the respective DSP 162", or this program code may be located in the memory 170 for collective access by the DSPs 162". As indicated earlier with respect to the prior embodiment, the program code should contain the algorithms needed to perform cell searching as indicated by the promulgated RAT standards, and which may be changeable according to instructions received from the upper layer 120. As also indicated earlier, the DSPs 162" may be replaced by specially-designed, dedicated hardware, rather than utilizing the more general-purposes DSPs 162".

Figure 8:
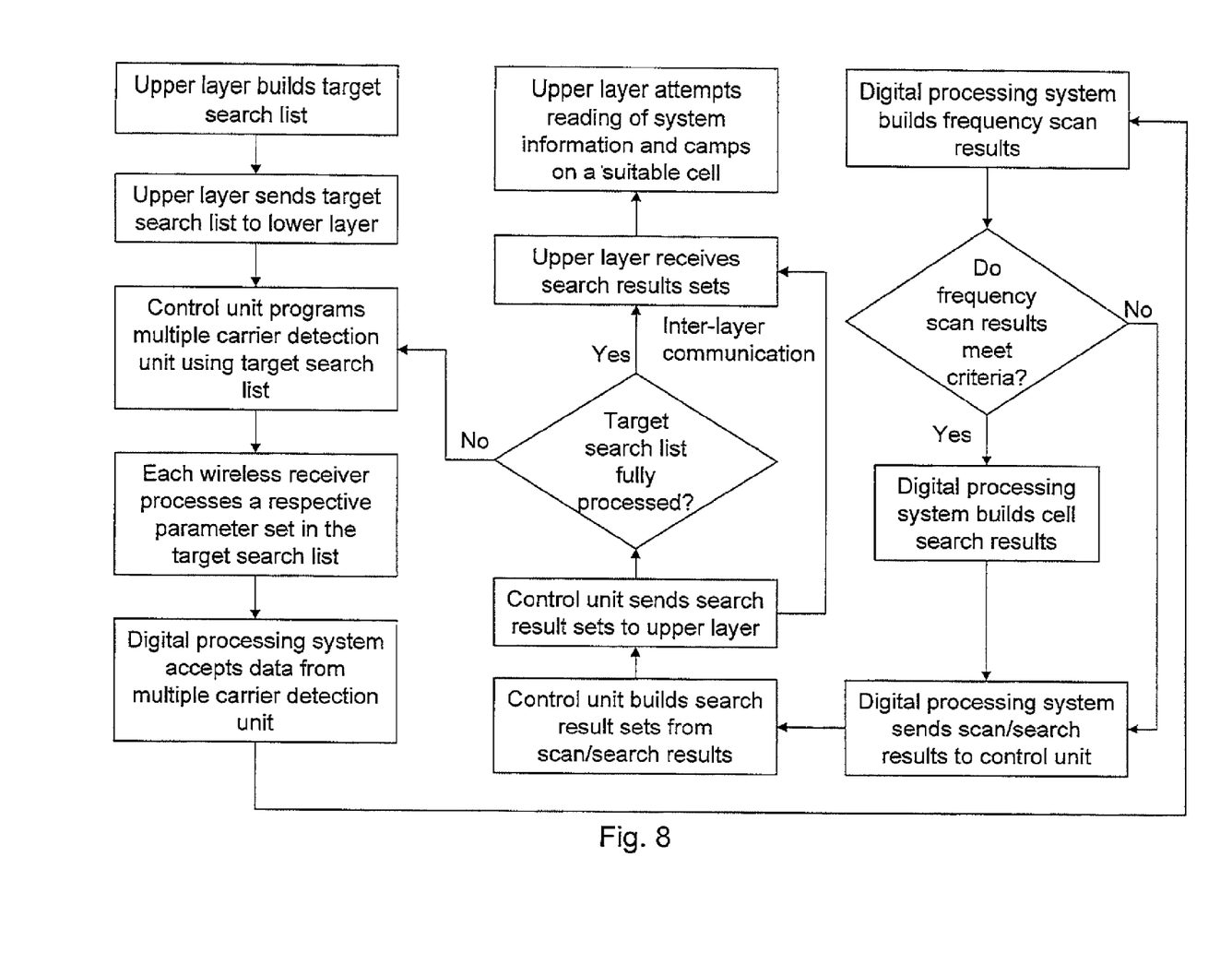
FIG. 8 is a flow chart for an embodiment cellular device.

With further reference to FIG. 8 in conjunction with FIGS. 2-5, to perform a cell search, the upper layer 120 determines a list of target cell searches that should be performed, and builds a corresponding target search list 180. The target search list 180 comprises a list of cell search parameter sets 182, and may be built, for example, by using the connection protocols database 140. Construction of the target search list 180 may also depend upon whether or not the device 100 is performing an initial cell search, or is performing an out-of-service cell search. For an initial cell search, the target search list 180 may include both frequency bands and sub-bands, while for an out-of-service cell search the target search list 180 may cover only frequencies within a frequency band that had been found in a previous initial cell search. The target search list 180 ideally has "n" or fewer entries 182, where "n" is the number of wireless receivers 159 within the multiple carrier detection unit 150, and is greater than zero. However, as indicated in the flowchart of FIG. 8, the number of entries 182 may exceed "n". Each entry 182 may contain cell search parameters that provide the information required by the lower layer 130 to perform a cell search for a target cell 101. The parameters within each cell search parameter set 182 may include frequency information 184 at which the carrier 102 being searched may be found, one or multiple RAT indicators 186, and network related information 188 that the carrier 102 is expected to be using. As previously indicated, the frequency 184, RAT 186 and network related information 188 in the cell search parameter sets 182 may be derived from the connection protocols database 140, which in turn may be generated based upon known industry standards. For example, the frequency information 184 and RAT 186 may be derived directly from the frequency information 144 and RAT 146 in a related protocol strategy 140. More generally, the target search list 180 may be directly derived from the connection protocols 140. As such, in certain embodiments, it may be possible that the target search list 180 is simply a direct copy of some or all of the protocol strategies 142, or may be links or pointers to one or more of the protocol strategies 142. It will be appreciated that the RAT indicator 186 may further include various implementation-specific sub-parameters to specify algorithmic cell-searching particularities of that particular RAT 186; for example, multi-Carrier detection in a so-called 4G RAT is performed using a Fast Fourier Transform, and this may be indicated to the lower layer 130 within the respective cell search parameter set 182. Or, the RAT indicator 186 may indicate, for example, that a GSM system utilizes TDMA/FDM access technologies, that a 3G system utilizes WCDMA technologies, or provide the underlying carrier and modulation techniques employed by the RAT. The upper layer 120 then provides the target search list 180 of cell search parameter sets 182 to the lower layer 130, which may be done, for example, by way of inter-layer signaling.

The lower layer 130 receives the target search list 180, and the control unit 132 uses the received target search list 180 to individually program each of the wireless receivers 159. Depending on the implementation of inter-layer communications, the control unit 132 may save the submitted list 180 in the memory 170, or the target search list 180 may be stored in a memory resource that is shared between the upper layer 120 and lower layer 130. The control unit 132 assigns to each wireless receiver 159 at least one of the entries 182 within the target search list 180 by, for example, programming the frequency selector 157 of the pre-processor 155 with the frequency 184 within the respective cell search parameter set 182, and programming the ADC 156 by setting the modulation selector 158 to correspond to the modulation used by the RAT indicator 186 within the respective cell search parameter set 182. Frequency selection may therefore be flexibly and quickly adapted. Once programmed and activated, each wireless receiver 159 begins to produce a respective digital stream 152 that corresponds to the frequency information 184, RAT 186, and network related information 188 of the corresponding cell search parameter set 182. If there are more wireless receivers 159 than there are entries 182 in the target search list 180, the lower layer 130 may place the unneeded wireless receivers 159 into a sleep state to save power, or may use one or more of the unneeded wireless receivers 159 for other purposes, such as to monitor frequency hopping.

Figure 9:
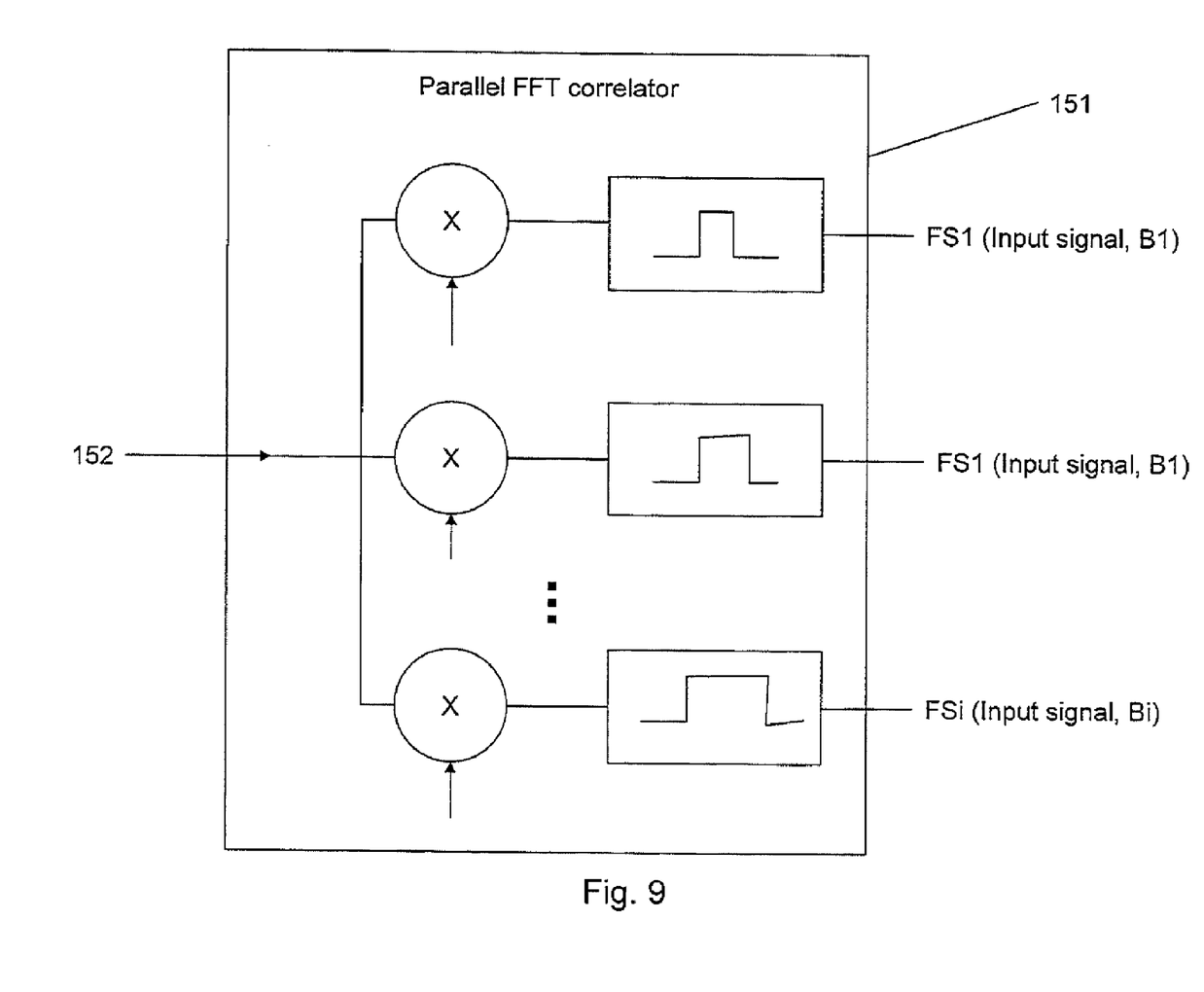
FIG. 9 illustrates one embodiment, performing advanced signal processing within a respective wireless receiver in a multiple carrier detection unit.

In certain embodiments, each wireless receiver 159 may additionally be provided circuitry, software or both to perform advanced processing upon the respective digital stream, or streams, 152. The advanced processing performed may be determined, for example, from the parameter set 182 used to program the wireless receiver 159, and in particular may be obtained from the RAT information 186. For example, as shown in FIG. 9, a wireless receiver 159 may include a parallel FFT correlator 151 for expected carrier bandwidths B1, B2 . . . Bi, as provided by the respective parameter set 182. This may be useful, for example, in WCDMA systems. The FFT correlator 151 may accept the digital stream 152 of the wireless receiver 159, and optionally of other wireless receivers 152, as input that may include different carriers of possibly differing bandwidths and noise levels to produce a series of frequency set outputs FS1, FS2 . . . FSi. Each frequency set output FSi may provide, for example, the location and power level of the center carrier frequency within the respective carrier bandwidth Bi of the frequency set FSi.

Once the wireless receivers have been programmed and begin producing their respective digital stream outputs 152, either the digital processing system 160, or, as indicated above, the respective wireless receivers 159 themselves, may begin processing the digital stream outputs 152 to generate signal processing results 192. The signal processing results 192 are generated as the cellular device 100 performs the cell searching operations required to find a suitable cell to camp upon, such as frequency scanning and RAT-dependent cell searching. Signal processing results 192 may include frequency scan results 191 (including scans of single frequencies and frequency bands), cell search results 192, or combinations of the two. In particular, the lower layer 130 may perform frequency scanning suitable for the respective RATs 186 of the wireless receivers 159. The digital processing system 160 may thus accept or build frequency scan results 191. If the frequency scan results 191 for a wireless receiver 159 satisfy certain criteria as set forth, for example, by the RAT 186, the digital processing system 160 may continue processing of the respective digital stream 152 to generate corresponding cell search results 190.

To perform the actual cell searching once the wireless receivers 159 have been properly programmed, the digital processing system 160 begins to apply the appropriate cell searching algorithms to each of the digital streams 152 according to the respective RATs 186 of that digital stream 152. The processing and algorithms needed to perform each respective cell search within the digital data stream 152 is well-defined by the underlying RAT technology specified in the RAT indicator 186, and the digital processing system 160 contains the algorithms needed to perform searching within supported RATs. As the cell searching on each of the digital streams 152 is being carried out, the digital processing system 160 builds the list of cell search results 190, which may be subsequently processed by the control unit 132 to generate entries 122 within cell search result sets 121. The cell search results 190 may include the related RAT, frequency, and RAT-dependent parameters, such as the scrambling code.

As the cell search results 190 and frequency scan results 191 are generated, the control unit 132 utilizes these signal processing results 192 to generate the entries 121 that are passed up or otherwise provided to the upper layer 120. In particular, the control unit 132 of the lower layer 130 may progressively collect the results 192 generated by the digital processing system 160, place the results 192 into a format expected by the upper layer 120 to create the cell search result sets 121, and then progressively send the cell search results entries 122 up to the upper layer 120. The control unit 132 may provide the results 192, in whole or in part, as they become available, may provide the results 192 at periodic intervals which, for example, the upper layer 120 may specify, or may provide the results 192 according to some other criteria, such as based on sufficiency of the data block size, timeout requirements, pre-processing requirements, or the like. If results 192 are provided by the lower layer 130 as a whole completely, or, for example, on a sufficient result basis for trying to camp on a cell (where the sufficiency level can be described initially by parameters provided by the upper layer 120), the upper layer 120 may sleep in the meantime until it obtains the results so as to save power if the upper layer 120 has nothing else to do.

Upon receiving the cell search results 122, the upper layer 120 may store the cell search results 122 within a list of cell search result sets 121. The entries 122 within the cell search result sets 121 may, for example, respectively correspond to the cell search parameter sets 182 within the target search list 180. The upper layer 120 may scan the cell search result sets 121 and determine whether or not to attempt to camp on a cell 101, or to perform another cell search. If an entry 122 within the cell search result sets 121 indicates that a suitable cell 101 and carrier 102 have been found, then the upper layer 120 may attempt to connect to the cell 101 by using the frequency and RAT corresponding to that entry 122. In particular, the device 100 may read system information in a downlink with a target cell 101 selected from one of the entries 122 in the cell search results sets 121. The frequency and RAT information for the target cell 101 may, for example, be present within the associated entry 122 itself, or may be obtained from the corresponding cell search parameter set 182 within the target search list 180. As a basis for determining whether or not to establish a network connection to a particular cell 101, the upper layer 120 may receive additional cell-related information or network-dependent information from the target cell 101 on the downlink connection that may then be stored in the related entry 122, and such information may assist in the selection of a suitable cell 101 or network, based upon, for example, whether or not the device 100 is permitted to camp upon the network or target cell 101. The information needed for such decisions is typically broadcasted by the cells 101. On the other hand, if the upper layer 120 determines that the lower layer 130 found no suitable cell 101, either because no cells 101 were found at all, or because no cells 101 were found that the device 100 has permission to use, then the upper layer 120 may update the target search list 180 for submission to the lower layer 130 to repeat the search procedure. A new target search list may be created, for example, in a manner similar to the creation of the original target search list 180 but with updated values of the various parameters within the target search list 180.

Because the lower layer 130 is capable of progressively informing the upper layer 120 of the results 192 of an ongoing cell search, the upper layer 120 can quickly react to frequency scan results 191 as they become available, and cell search results 190 as they become available. Moreover, the lower layer 130 can react to frequency scan 191 and cell search 190 results as they come in. For example, if a data stream 152 from a wireless receiver 159 is showing low or null power characteristics, or otherwise fails criteria specified in the related cell search parameter set 182 (that is, the frequency scan results 191 are unsatisfactory), the digital processing system 160, or the control unit 132, can react quickly to this situation. For example, if more entries 182 within the target search list 180 are waiting to be processed, the control unit 132 may abandon the current entry 182 being processed by the wireless receiver 159 and reprogram the wireless receiver 152 with a new entry 182. Similarly, if the upper layer 120 determines that an entry 121 indicates that further searching within a target parameter 182 is futile, the upper layer 120 can signal such information to the lower layer 130, which may then reprogram the respective wireless receiver 159 according to a new target parameter set 182; the upper layer 120 may thus interrupt cell searching or scanning of a particular target entry 182 that is currently being processed for another target entry 182 which has not yet been processed. Accordingly, resources within the digital processing system 160, and in the multiple carrier detection unit 150, can be quickly freed for other processes, or shut down to save power.

The lower layer 130 continues with the above cell searching algorithm until either all entries 182 within the target search list 180 have been exhausted, or the upper layer 120 informs the lower layer 130 to stop the cell searching. Additionally, at any time during the cell searching routine, the upper layer 120 may request the lower layer 130 to change an activity. For example, the upper layer 120, such as via inter-layer signaling, may request that the lower layer 130 reprogram a wireless receiver 159, as alluded to above.

As also indicated earlier, it is possible to design the cellular device 100 so that the upper layer 120 can view results 192 as they become available by providing direct communications between the layers 120, 130. For example, in some embodiments, it may not be necessary for the control unit 132 to pass up any results entries 122 to the upper layer 120, for the control unit 132 may assume that the upper layer 120 is continuously watching the raw results 192 produced by the digital processing system 160, and optionally by the wireless receivers 159 themselves, as they are made available.

Figure 10:
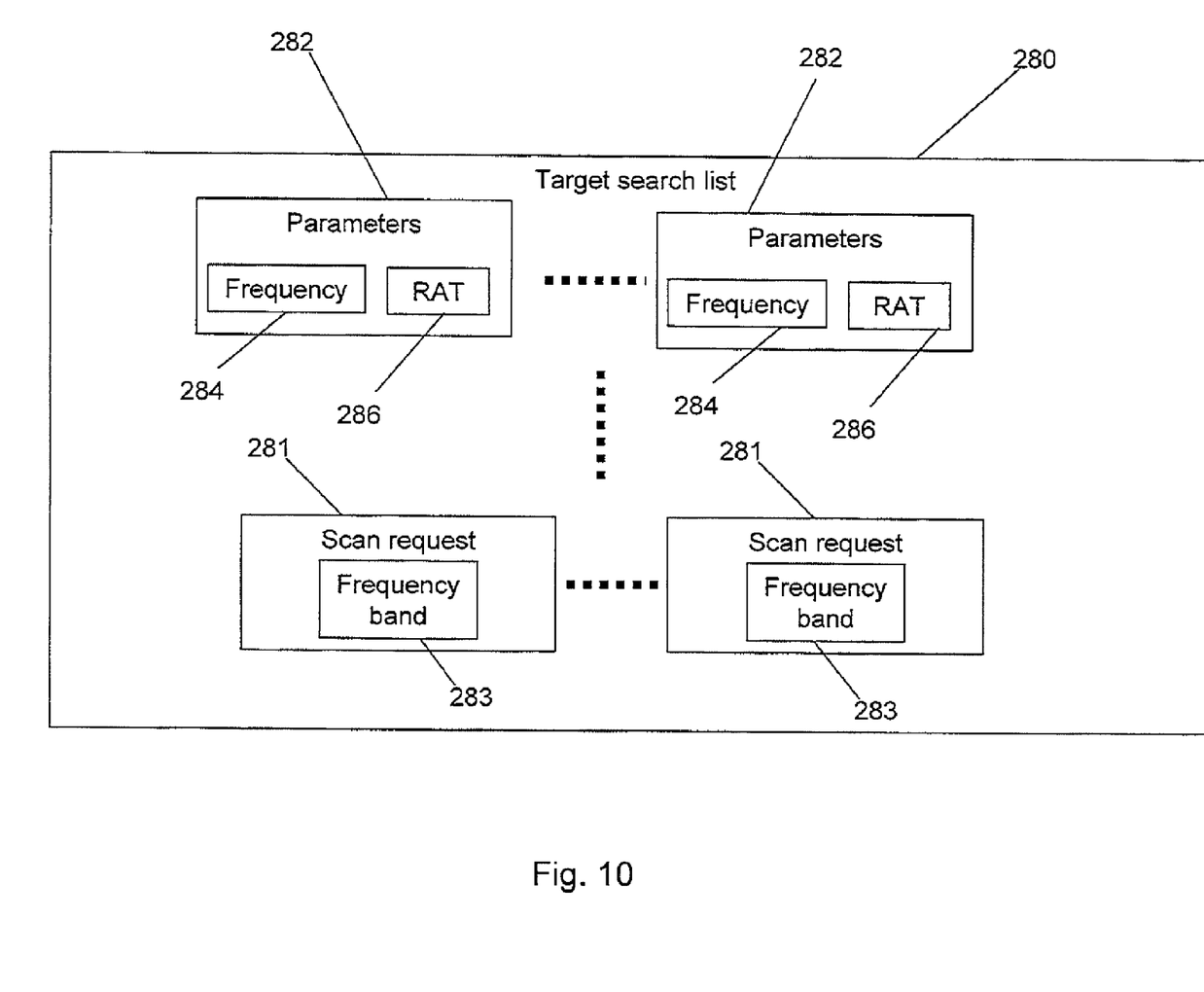
FIG. 10 shows an alternative target search list.

The target search list 180 need not be limited only to requesting cell searches. In other embodiments, as shown in FIG. 10, a target search list 280 may include not only cell search parameters 282 for cell searches on distinct frequencies 284 and given RATs 286, but may also include zero or more frequency band scan requests 281. Each frequency band scan request 281 may include a frequency band parameter 283 indicating some frequencies that the upper layer 120 desires the lower layer 130 to scan. The frequency band parameter 283 may indicate, for example, an entire frequency band within a RAT, a sub-band within the RAT, a frequency grid within a sub-band, or the entire frequency band available to the cellular device 100. When processing the frequency band scan request 281, the lower layer 130 appropriately programs the respective wireless receiver 159 assigned to the scan request 281 to perform the desired scan. The DSP 160 may be used, for example, to help perform the frequency scan request. The frequency band scan results 191 may then be processed with the cell search results 190, and other frequency scan results 191, and passed back up to the upper layer 120. Such inter-layer signaling may be performed, for example, in asynchronous modes using messaging or interrupt interfaces, or in synchronous modes by way of a controlled timer. Upon receiving the signal processing results 192, the upper layer can use these results 190 to build additional target search lists 180. The upper layer 120 may make additional target search requests in this manner.

By being able to process cell search requests, frequency scan requests or both in parallel, the present invention may provide faster overall cell search results, and hence faster connection times and fewer dropped data links. Indeed, the present invention may provide cell search times for multiple RATS in under the time required for a conventional cell search using a single RAT. Because the upper layer informs the lower layer, for example, of all the RATS to be used in the cell search, the lower layer is able to perform faster cell searches overall; the lower layer may optimize the entire cell search process across all RAT technologies, frequencies, frequency bands, or any other decisional parameters, such as priorities. Indeed, by having all relevant parameters at once, the lower layer can perform global optimum cell searches rather than local or partial optimum iterative cell searches. Parallel processing may thus be used where it is suitable. Moreover, the instant invention permits the upper layer to prioritize certain types of searches, and allows the lower layer to make efficient resource allocations based upon these priorities. For example, to provide prioritization, the upper layer may include priority information as a specific attribute to each scan or search request, which attributes are then passed down to the lower layer. The lower layer may then allocate resources based upon the provided priority information. The results provided by the lower layer to the upper layer permit the upper layer to make faster decisions when searching for a cell.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A method of performing a cell search for a cellular device comprising:
    providing a plurality of cell search parameter sets for a respective plurality of target searches;
    simultaneously performing cell searching operations for the target searches according to the cell search parameter sets to obtain signal processing results; and
    the cellular device connecting to at least one cell according to the signal processing results,
    wherein the cellular device comprises a stacked protocol having an upper layer in communications with a lower layer, and the method further comprises:
    the upper layer generating the cell search parameter sets;
    the lower layer utilizing the cell search parameter sets to simultaneously perform the cell searching operations related to the target searches;
    the lower layer generating at least one signal processing result for each of the respective target searches; and
    the upper layer causing the cellular device to camp on at least one cell corresponding to the at least one of the signal processing results.

2. The method of claim 1 wherein the signal processing results respectively correspond to the cell search parameter sets.

3. The method of claim 1 wherein each target search has associated frequency information, and the lower layer utilizes the frequency information to perform the respective target search.

4. The method of claim 3 wherein each target search has at least one associated radio access technology (RAT), and the lower layer performs the respective target search according to the at least one associated RAT.

5. The method of claim 4 wherein each cell search parameter set includes the respective frequency information and the respective RAT.

6. The method of claim 1 wherein the lower layer progressively provides the upper layer the signal processing results.

7. The method of claim 6 wherein the upper layer causes the lower layer to interrupt a cell searching operation corresponding to at least one of the cell search parameter sets in response to receiving at least one signal processing result.

8. The method of claim 1 wherein the lower layer automatically changes a cell searching operation corresponding to one of the cell search parameter sets for a cell searching operation related to another cell searching parameter set that has not yet been processed.

* * * * *